Figure 1:
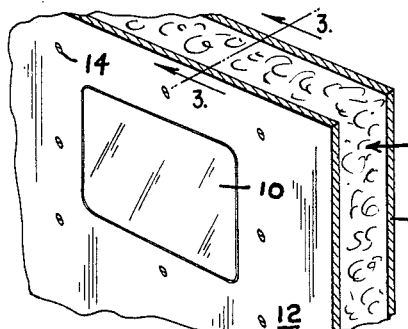

June 29, 1965 A. SLAMAN ET AL 3,191,240
MULTI-PANE WINDOW PANELS
Filed April 20, 1961

INVENTOR.
ALBERT SLAMAN,
BY ANGELO GUALTIERI
Pattison, Wright and
Pattison ATTORNEYS United States Patent Office 3,191,240
Patented June 29, 1965

3,191,240
MULTI-PANE WINDOW PANELS
Albert Slaman, 3504 Runnymeade Place, Washington, D.C., and Angelo Gualtieri, 10030 Counselman Road, Bethesda, Md.
Filed Apr. 20, 1961, Ser. No. 104,343
5 Claims. (Cl. 20—40.5)

The present invention relates to panel structures and more particularly and specifically to a multi-pane window panel construction.

In a number of vehicle forms in use today it is a common objective to maintain minimal interior noise level for the purpose of increasing passenger comfort and reducing noise fatigue. In certain vehicle forms, as for example aircraft, it is further necessary to provide a pressure-type body or skin to enable maintenance of inner and outer pressure differentials for passenger comfort and safety.

It is a general object of this invention to provide a window panel structure which, in addition to maintaining good optical clarity, provides an effective barrier to sound transmission and which serves to maintain a strong, tight closure for separation and maintenance of opposed pressure differentials.

Another object of this invention rests in the provision of a window panel construction which may be used as the prime structural window of a vehicle, or one which may be used as a secondary sound and pressure barrier in conjunction with a typical prime window.

Still another object of the present invention resides in the provision of a window panel formed by a multiple of clear plastic sheets portions of which are spaced apart to provide an air-filled or evacuated barrier therebetween and which are joined peripherally to provide a rigid, structural mounting frame.

A further object of this invention lies in the provision of a window panel construction formed by spaced sheets or layers of a plastic composition of substantial strength and optical clarity which may be mounted in a vehicle window in such a manner that the panel is out of contact with the structural elements of the vehicle avoiding contact with noise and vibration transmitting components of the vehicle.

Still a further object of the present invention is the provision of a window panel construction of strong, safe design with maximum optical clarity and acoustical barrier factors which is simple and inexpensive in manufacture and which is minimal in weight and cost of installation.

Yet another object of this invention lies in the provision of a simple and inexpensively practiced method of manufacturing a window panel having the physical and functional attributes hereinbefore described.

Still further objects and advantages of the present invention will become readily apparent to one skilled in the art when the following descriptions and disclosures are read in the light of the accompanying drawings.

The nature of the present invention may be described in general terms as relating to a window panel construction which includes a pair of spaced, clear plastic sheets which are joined by offset peripheral marginal flange portions into a unitary panel wherein said united flange portions form a rigid mounting frame for attachment in a window opening, and wherein such structure provides an area between said spaced sheets within the frame which may in manufacture be evacuated to provide a dead air acoustical and temperature barrier.

Generally, the present invention further contemplates a simple and inexpensive step by step method for manufacturing a panel such as that generally defined.

Figure 2:
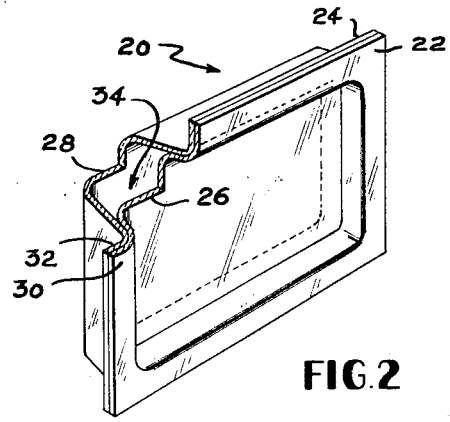
Figure 3:
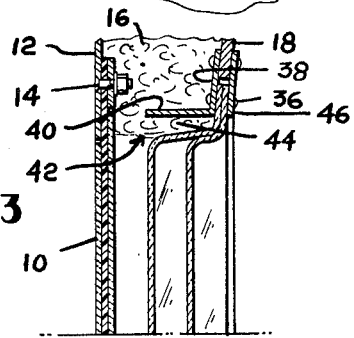
Figure 4:
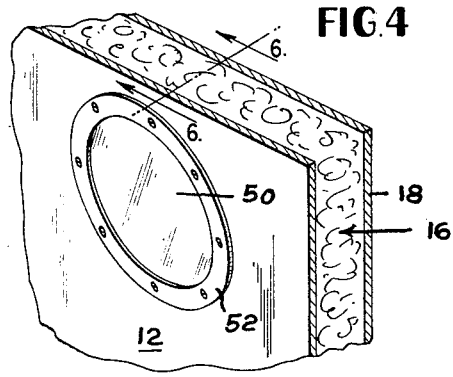
Figure 6:
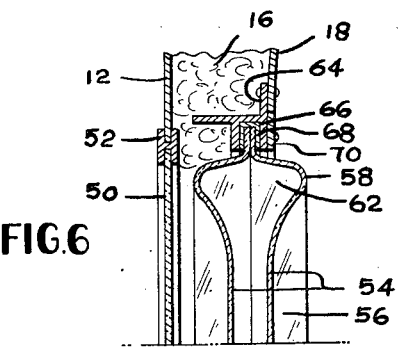
Figure 5:
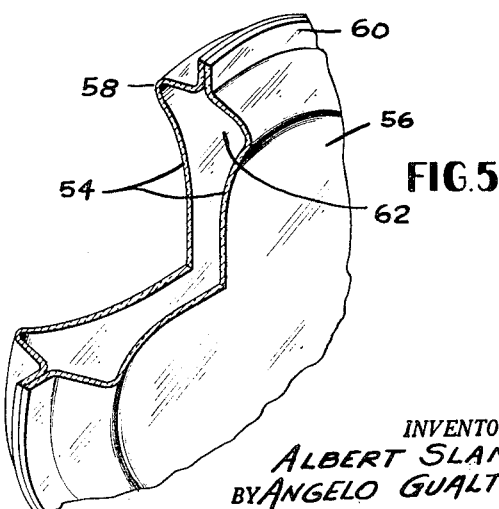
Figure 7:
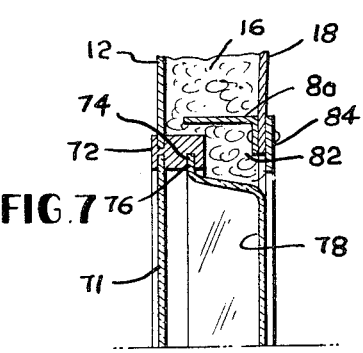

Referring now to the accompanying drawings in which like numerals designate similar parts throughout the several views:
FIG. 1 is a pictorial external view of a vehicle window.
FIG. 2 is a perspective view in fragmentary section of a panel assembly constituting a preferred embodiment of the invention.
FIG. 3 is a vertical section taken on line 3—3, FIG. 1.
FIG. 4 is a view similar to FIG. 1 of a modified window installation.
FIG. 5 is a view similar to FIG. 2 of a circular panel form.
FIG. 6 is a vertical section on line 6—6, FIG. 4.
FIG. 7 is a vertical section similar to FIGS. 3 and 6 of a further modified panel assembly.

The present invention is hereinafter described in conjunction with aircraft window installations for purposes of clarity of description and understanding, but the present invention is not intended to be limited to aircraft uses or combinations therewith.

In a typical aircraft window installation, such as illustrated in FIG. 1, a rigid safety plate glass panel 10 is secured to the outer structural skin 12 of the aircraft body by conventional means 14 which will vary from manufacturer to manufacturer of airframes. It has been usual, to satisfy required safety factors, to provide a second glass panel inwardly from the outside panel and secured in the same frame therewith. The frame is recessed into the insulation space 16 between the skin 12 and the interior finishing wall or trim 18 of the vehicle. This typical construction has placed the interior panel in direct contact through the common frame with the outer panel and structural skin of the vehicle thereby establishing a rigid uninterrupted conductor of vibration and noise directly to the vehicle interior.

In the preferred form of the present invention the typical inner glass panel is replaced by a two-piece plastic panel 20, FIG. 2, which is secured to the non-structural inner wall or trim 18 of the vehicle. When the present invention is utilized, an exterior, dual safety plate panel 10 is secured by conventional means to the structural skin 12 of the vehicle to close the window opening in the outer skin. The novel panel 20 is then secured to the inner wall 18 with the dual panes of the panel being recessed in the insulating area 16 between the inner and outer vehicle walls.

The panel 20 consists of two sheets of optically clear plastic 22 and 24 each of rectangular configuration and each having a rectangular cup 26 and 28, respectively, drawn centrally of the sheet. The cup formation 26 in panel 22 is relatively shallow while the cup formation 28 drawn in sheet 24 is deeper and is drawn over a slightly greater area so as to permit cup 26 of sheet 22 to recess therein, whereby marginal flange portions 30 and 32, respectively, about the cup formations in each sheet will be brought in face to face coincidence peripherally about both sheets. When the sheets are nested as described the outer surface of the side walls of the cup formation 26 of sheet 22 will lie in surface to surface contact with a portion of the inner surfaces of the side walls of the cup 28 of sheet 24 as is seen in FIGS. 2 and 3 thereby providing a closed area 34 between the bottom walls of the cup formations 26 and 28 within the areas of marginal contact between the two sheet elements.

In installation of the panel 20, the juxtaposed marginal flange portions 30 and 32 of the two sheets composing the panel are positioned peripherally about a window opening in the inner wall 18 of the vehicle with the marginal flange portions being secured, as for example at 36, to a back-up element 38 for the inner vehicle wall.

The back-up element may be flanged as at 40 toward the outer structural skin to provide peripherally about the drawn cup portions of the panel a restricted area 42 which may be filled with an insulating or padding wadding 44 for obvious purposes. A trim piece 46 may be provided to finish off the point of attachment between the panel and the inner wall 18.

In the formation of the panel 20, the sheets 22 and 24 are separately formed and may be separately installed in the vehicle with their only form of attachment, one to the other, taking place when the common marginal frame portions thereabout are jointly secured, as at 36, in the vehicle. On the other hand, the marginally contacting portions of the two panels may be sealed together chemically, by adhesives or by conventional plasticizing under heat so that the dual sheets are formed into a unitary panel. When so joined the area 34 may be left with air therein, or, by an evacuation needle injected into the area, the area may be evacuated with the needle access thereafter sealed.

In FIG. 4 of the drawings there is shown a modified form of the present invention adapted for use with a circular vehicle window wherein a typical safety plate panel 50 is secured within a circular frame 52 which in turn is secured within a circular opening in the outer skin 12 of the vehicle. A pair of identical circular plastic sheets 54 are joined to form a hollow panel to be supported within the recessed area from within the vehicle. Each plastic sheet 54 is molded or vacuum-drawn to provide a concentric central area of concave configuration 56 defined within a circular rib 58 spaced inwardly from the edge of the panel with a marginal area 60 peripherally outside the rib curving away from the rib to project in substantially an identical plane with the lowest portion of the concave central area. A panel is assembled by placing the two identical sheets in back to back opposition with the rib elements projecting in opposed directions and with the marginal areas 60 in abutting coincidence and secured together to provide a rigid circular frame about the panel and to enclose the area 62 formed between the spaced, curved central portions of the sheets.

When this modified panel is secured in the window opening a back-up member 64 secured to the inner wall 18 of the vehicle, in projection toward the outer wall, is shaped to define a frame receiving opening 66 into which the panel marginal areas are recessed within a cushioned socket 68 and retained in place. A trim piece 70 is secured to the inner wall to finish off the interior about the window opening.

As in the case of the first described panel form, the sheets 54 may be heat sealed or otherwise secured together in their marginal areas to provide an air-filled or evacuated hollow panel structure.

In FIG. 7 of the drawings there is shown a still further modified form of this invention in which a typical safety plate window 71 is secured in a rigid frame 72 mounted in the window opening in the external skin of the vehicle wherein the frame 72 is provided with a second panel receiving recess 74 in which is mounted a marginal flange 76 of a single sheet of plastic, the central portion of which is drawn into a cup 78 which, when so mounted, projects toward the interior of the vehicle with the bottom wall of the cup area lying in a vertical plane approximating that of the inner wall 18 of the vehicle. A back-up element 80 of the inner wall of the vehicle forms a padding cavity 82 similar to those hereinbefore described and a trim 84 finishes off the interior window opening.

A typical method by which a window panel structure of the general type herein described would be formed would include the steps of: cutting to size two sheets of an optically clear thermoplastic; heating each sheet to a preselected temperature; forming by vacuum drawing or die expressing the central area of each heated sheet to a preselected configuration while retaining a marginal portion thereabout against deformation; placing the two sheets in juxtaposed coincidence with the marginal portions in registry; and bonding the marginal portions together. A further step, where desired, would include the evacuation of areas defined between non-contacting surfaces of the sheets during or after bonding of the marginal areas thereof.

In practice of the aforedescribed method it is essential that heat cycles and forming forces be carefully controlled to avoid distortion of the optical clarity of the plastic sheets.

From the foregoing it is seen that simple, inexpensive, lightweight and effective window panels may be produced for uses where optical clarity, strength and noise and temperature barriers are required, such as for example, in aircraft and space vehicles, test laboratories, and the like.

Having thus described and explained our inventive concepts in terms of preferred and modified structural embodiments thereof, and having illustrated and described structural and method concepts which satisfy and attain those objects and advantages hereinbefore set forth, what we desire to claim is:

1. A window panel construction consisting of a pair of transparent plastic sheets of similar peripheral configuration, said sheets having cups drawn centrally thereof with peripheral marginal flanges thereabout, one sheet cup being shallow and the other sheet cup being deep, said sheets positioned with the shallow cup seated in the deep cup and the peripheral marginal edges of the two sheets and the side walls of the two cups to the extent of their contiguous depth being in contact, and said marginal edges of the two sheets being secured together throughout the extent of their contact.

2. A window panel construction as defined in claim 1 wherein the area between the cups of the two sheets is evacuated.

3. In combination: a structural wall including spaced inner and outer sheaths having a framed opening therethrough closed by a glass panel secured to the outer sheath; an acoustical window panel structure consisting of a pair of transparent plastic sheets of matching peripheral configuration, each of said sheets having convavities formed centrally thereof to configurations substantially coinciding with the structural wall opening and each surrounded by a marginal flange, the concavities of the two sheets being of distinctly different depths, said sheets being positioned with the deeper concavity receiving the lesser concavity and with said marginal sheet flanges and the side walls of the concavities to the extent of their co-extension being in contacting coincidence, and said marginal flanges being secured to the inner sheath of the structural wall with the concavities of said panel sheets disposed toward the glass panel.

4. A combination as defined in claim 3 wherein the area defined between the cups of the two sheets is evacuated.

5. A window panel construction consisting of a pair of transparent plastic sheets of identical peripheral configuration, said sheets having cups drawn centrally therein with peripheral marginal flanges thereabout, the side walls of said cups being substantially perpendicular to the peripheral marginal flanges, one cup being shallow and the other cup being deep, said sheets positioned with the shallow cup seated in the deep cup and the contiguous side wall portions of the cups and the peripheral marginal edges of the two sheets being in surface to surface contact, and said marginal edges of the two sheets being secured together throughout the extent of their contact.

References Cited by the Examiner

UNITED STATES PATENTS 2,325,773   8/43   Hennessy _____ 126—200
2,341,673   2/44   Walker _____ 20—40.5 X (Other references on following page)

UNITED STATES PATENTS

| | | | |
|---|---|---|---|
| 2,624,978 | 1/53 | Hohmann | 20—40.5 X |
| 2,756,467 | 7/56 | Etling | 20—56.5 |
| 2,794,368 | 6/57 | Kosa | 20—56.5 X |
| 2,885,135 | 5/59 | Friday | 229—2.5 |
| 2,912,724 | 11/59 | Wilkes | 189—34 X |
| 2,918,023 | 12/59 | Beltcher | 20—56.5 X |
| 3,082,903 | 3/63 | Stevens et al. | 229—2.5 |

FOREIGN PATENTS

| | | |
|---|---|---|
| 429,751 | 6/35 | Great Britain. |
| 829,442 | 3/60 | Great Britain. |
| 864,727 | 4/61 | Great Britain. |

HARRISON R. MOSELEY, *Primary Examiner.*

GEORGE A. NINAS, Jr., LAWRENCE CHARLES,
*Examiners.*